2,866,700

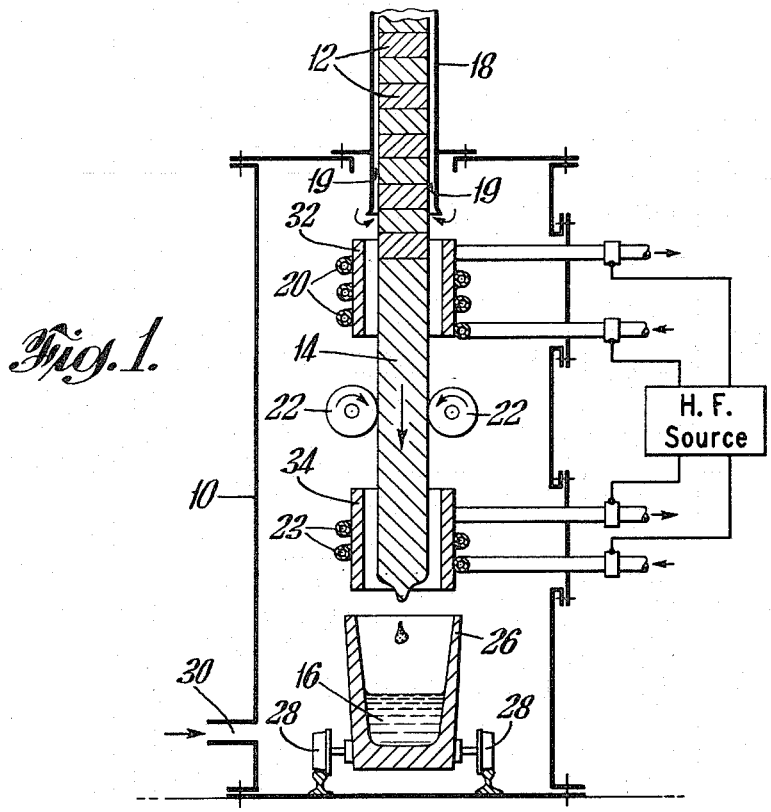
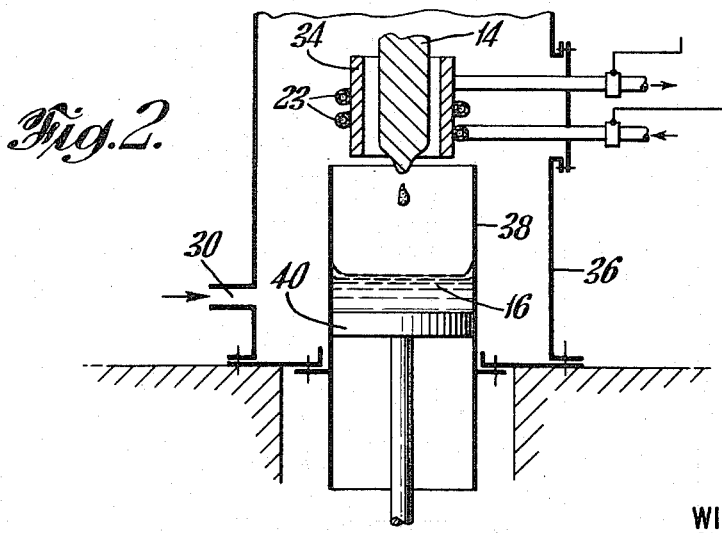

DRIP-MELTING OF REFRACTORY METALS

William J. Bohnet, Niagara Falls, and Glen D. Bagley, Lewiston, N. Y., assignors to Union Carbide Corporation, a corporation of New York Application May 4, 1954, Serial No. 427,432

9 Claims. (Cl. 75—10)

This invention relates to an improved method and apparatus for melting reactive-refractory metals.

Because of their high melting points, reactive-refractory metals such as titanium, zirconium and the like are produced in a finely divided or "sponge" state in which they are of little commercial application. Before these metals can be used industrially, it is necessary to convert them to a massive ingot form. This transformation requires special techniques, as even minute amounts of certain atmospheric gases cause harmful contamination of these highly reactive metals.

Hitherto, the conventional practice has been to melt the reactive metal in an inert gas atmosphere by slowly feeding the powdered metal into a water cooled mold, while playing an arc over the surface of the metal so fed. In this method the arc is usually drawn between the ingot being formed and a tungsten or carbon electrode or series of such electrodes. The melting units presently used commercially utilize a series of elaborate air locks which so limit the continuity of the melting operation as to render it a batch process.

The present practice has several disadvantages. For one, as contamination of the metal being fused by the electrode must be avoided, melting must be carried out with a direct current arc, the electrode being of negative polarity, since such polarity tends to reduce ionic transmission of the electrode material to the molten bath. Unwieldly, high capacity direct current machinery is required for the production of this power. In spite of all precautions, some splashing or vaporization of the metal being fused still occurs, with the result that the tungsten or carbon electrodes form compounds or alloys which drip off the electrode into the ingot, and contaminate it.

Another objection to the conventional method of melting reactive metals arises as a result of its inability to maintain the entire surface of the ingot in a molten condition so that its outer surface is free of ridges, seams and other defects. The ever present possibility of melting through the wall of the water cooled copper crucible mold is the primary factor responsible for the occurrence of such defects. Even if the wall is not completely melted through into the water chamber, any fusion which may occur will result in the alloying of the ingot metal with the crucible metal. To guard against such possibility, the melting arc must be so located and controlled that it is never directed against the wall of the crucible, for otherwise fusion of this wall will occur. Generally the ingots produced by the instant technique require surface conditioning to remove the defects mentioned above. Practically, this limitation makes necessary a controlled balance between heat input from the arc and heat losses through the crucible wall, and limits the size of the pool of molten metal that can be maintained within the crucible.

Still another difficulty commonly encountered with the arc melting method stems from the chilling effect of powdered material as it is fed into the molten metal in the water cooled crucible. There the molten material is disposed in the form of a usually thin and easily chilled pool. When powdered metal is fed in at too rapid a rate, the added material may not melt completely, and an unsound ingot will result. To obtain complete soundness of the metal in the interior of the ingot, the powdered metal thus must be fed at a uniform rate, and its particle size must also be controlled to avoid the presence of large particles which naturally exert a greater chilling effect.

Another difficulty sometimes encountered in arc melting is that caused by the influence of impurities or additives on the character of the arc. In this connection it is known that such materials affect the efficiency of the melting arc by altering ionization characteristics within the arc column. Some of them will cause a much greater loss of heat by radiation from the arc column to the walls of the crucible than others, and may in certain cases decrease the melting rate of the metal.

Another difficulty in arc melting is the extremely high local temperatures of the cathode and anode spots. This results in heating some of the metal to the boiling point, and causes loss of that metal by vaporization. Some of the vapors thus produced are of sufficient volume and density to obscure the melting operation.

Attempts have been made in the past to overcome the foregoing difficulties by forming electrodes from compacts of the metal to be melted, but these efforts have been only partially successful because they are used in conjunction with arc melting, and retain the defects inherent in the use of such an arc.

It is accordingly a prime object of this invention to provide a method for the conversion of reactive metal sponge to massive metal which will obviate the objections heretofore stated by eliminating the arc hitherto employed.

A further object of this invention is to provide an apparatus having a design particularly simple in comparison to devices now used on a large scale for this operation, and which will require no elaborate air locks for continuous introduction and removal of raw material and finished product.

A still further object of this invention is to remove the possibility of metal contamination.

Another object of this invention is to eliminate surface defects in reactive metal ingots by improving the regulation of the heat input through the ingot metal.

Still another object of this invention is to eliminate the need for controlled feeding and sizing of the metal being fused.

Yet another object of this invention is to eliminate the effect of impurities on arc characteristics by eliminating the use of a heating arc.

Essentially the method of the invention whereby these objects are achieved comprises pre-forming briquets of crude metal sponge, sintering the juxtaposed briquets to form a continuous rod of compressed metal sponge, and further heating the rod to cause the metal to fuse and drip into a collecting crucible mold where the molten drops can coalesce into a massive body of metal. The heating is effected by high frequency induced currents, and thus eliminates the numerous disadvantages of arc heating.

The apparatus in which this method may be employed comprises a protective chamber within which are placed in coaxial relationship a sintering-heating inductor; motion regulating means, a fusion heating inductor, a crucible mold, and an entrance tubular guide for briquets mounted on top of the chamber, and if desired, an exit guide for the ingot.

Fig. 1 is an elevational view of an apparatus suitable for the practice of this invention.

Fig. 2 is a partial view of a modification of the apparatus shown in Fig. 1, which is suitable for continuous casting.

The process of the invention will be more readily understood by referring in detail to Fig. 1. The melting equipment consists of a single closed chamber 10 within which the entire series of operations of sintering of the briquets 12 to form a continuous rod 14, regulation of the feed rate of the rod, melting of the rod and forming of ingot of the fused metal 16 may be carried out simultaneously. The chamber or housing is essentially gas-tight, except for a tubular guide 18 which allows the passage of the briquets to the sintering position. The briquets may be fed manually through the entrance guide 18 or through a feed compartment having automatic pusher means, and a feed chute connected to the guide may be mounted above the apparatus chamber 10. The tubular guide 18 which is mounted in the top of the housing has internal dimensions slightly larger than the external dimensions of the briquets formed from the sponge of the reactive metal to be fused. Spaced a short distance below the lower orifice of this guide tube is the inductor 20 of the first high frequency heating system or sintering high frequency coil, this coil being coaxial with the tubular guide. Slightly below the first inductor is a pair of mechanically operated rolls 22, which both support and regulate the motion of the sintered briquets as well as synchronize such movement with the rate of melting of the briquets. Slightly below this assembly is a second inductor or melting high frequency coil 23, coaxially situated with respect to the tubular guide and the first inductor. Below this second inductor lies a collection crucible 26 supported on a travelling mold carrier 28. The interior of the protective chamber is kept free of embrittling gases and vapors by introducing therein an atmosphere of inert gases such as argon and helium or mixtures thereof, in the chamber through a conduit 30. Exhaust means for this gas are provided by the annular clearances 19 of the top guide 18 in such a way that the gas will prevent the entry of air with the briquets, as well as sweep out any gas that may be released from the briquets before they reach oxidizing temperatures.

It is of special importance to note that this arrangement of the protective chamber permits the continuous introduction of the raw material by completely eliminating the need for elaborate air locks such as are hitherto employed in melting apparatus for reactive metals. During this process the inductor coils are protected from damage due to radiation from the metal charge by suitable radiation shields 32 and 34. These shields also reduce loss of heat from the charge.

As an example of the melting procedure of this invention, titanium briquets, each 1¾ inches in diameter by 1¼ inches in height were conventionally pre-formed from titanium sponge, thereby obviating the need for controlled feeding and sizing of the metal. The system above described was loaded with seven of these briquets through the top tubular guide. The interior of the chamber was flushed with argon to remove the last traces of air. High frequency power corresponding to an input of 30 kilowatts was supplied to the first inductor coil to bring the briquets to a sintering temperature. When this temperature was reached, movement of the feed roll was initiated, additional briquets were fed through the top of the tubular guide, and the column of briquets moved downward, the sintering action being continuous and automatic as the briquets were fed through the first inductor coil. Once the column of sintered briquet was formed and its motion initiated, the sintered briquets moved downwardly, entered the second inductor coil functioning under the same power input, where the temperature of the column was further raised to the melting point of titanium. The lower end of the column was melted and the metal cast in the bottom of the crucible in the form of a massive body of titanium metal substantially free of internal and surface discontinuities.

Whenever desired, the crucible mold, if made from an electrically conducting material, may be raised above its normal position to bring its upper portion within the influence of the high frequency field generated by the second inductor to raise the temperature of the mold and reduce its chilling effect upon the molten metal dripping from the sintered rod of refractory metal. The position of the crucible mold may be regulated by moving it along a vertical path on its carrier to maintain the chilling at the desired degree, this action being particularly advantageous when a continuous ingot of metal is to be formed. By means of this regulating, pre-heating action, seams, laps and discontinuities on the surface of the ingot can be completely eliminated. Such pre-heating, of course, is impossible with the water cooled casting molds required by the arc casting process.

For continuous casting, in which process the solidified part of the ingot is removed while its upper portion is still molten, the bottom of the crucible may be movable and a second tubular guide having dimensions such that this false bottom of the crucible mold may be moved downward therethrough, can be positioned in the bottom of the apparatus chamber. The formed ingot may then be continuously withdrawn by using pinch rollers having a suitable drive engagement with it or in some other way.

One modification of this invention suitable for continuous casting is illustrated in Fig. 2, in which the bottom of the melting chamber 36 is provided with a tubular exit guide 38, whose upper part serves as a crucible mold, wherein a false bottom such as a piston arrangement 40 is conformably disposed and operated so as to permit the continuous removal of the formed ingot. The equipment thus requires no elaborate air locks, and the like, as heretofore reduced the melting of refractory metals to a batch basis, but on the contrary makes possible the continuous introduction and removal of raw material and finished product from the melting chamber.

Since the reactive metals exhibit fairly large coefficients of thermal expansion, contraction upon cooling provides the required clearance between the casting mold and the finished ingot, so that the ingot may be moved downward through the mold without difficulty.

Although the present specifications and the appended figures show the operations of sintering and melting occurring simultaneously, this is not essential to the method of this invention, as the metallic briquets may be pre-sintered prior to their exposure to the fusing induction heating source.

The present invention greatly simplifies the procedure of melting reactive metals, and offers many advantages over prior techniques. The method of this invention permits the continuous and automatic joining of briquets under precisely controlled conditions. Its method of melting permits generation of heat within the metal being fused rather than merely applying the heat to its outer surface, thereby improving the efficiency of melting. The rate of melting is limited only by the capacity of the power equipment and not by the size of the arc which may be safely employed in the melting crucible. Further, the method of the present invention removes the batch method limitation hitherto inherent in commercial methods of melting refractory metal.

While for illustrative purposes the invention has been described in connection with the production of massive titanium, it is understood that its method applies in general to reactive and refractory metals.

What is claimed is:

1. A method of producing reactive-refractory metals in ingot form, which comprises providing an inert atmosphere in a suitable melting furnace, introducing pre-formed briquets of the refractory metal in said furnace, sintering said juxtaposed briquets within said furnace and there joining said briquets together to form a continuous rod of metal, and induction heating this rod so as to fuse it.

2. A method of producing titanium metal in ingot form, which comprises providing an inert atmosphere in a melting furnace, introducing pre-formed briquets of titanium metal in said furnace, sintering said juxtaposed briquets within said furnace and there joining said briquets together to form a continuous rod of metal, and induction heating this rod so as to fuse it.

3. Apparatus for producing reactive-refractory metals in ingot form, which comprises a substantially closed vessel having in coaxial relationship therein high frequency inductor coils for continuously sintering into rod form, metal briquets, motion regulating means to bring said rod within the melting action of fusion heating inductor coils, collection crucible, inlet and outlet means fixedly united with said vessel, whereby said vessel is maintained filled with a gas inert to the molten metal, radiation shields protecting the aforesaid heat sources from damage due to radiation from the metal rod, and tubular entrance guides conformably disposed in said vessel to allow entrance of metal briquets.

4. In the apparatus of claim 3, the improvement consisting in the use of a crucible having a false bottom to facilitate formation of continuous ingots.

5. Apparatus for producing reactive-refractory metals in ingot form, which comprises a substantially closed vessel having in coaxial relationship therein, high frequency induction coils for sintering into rod form, metal briquets, motion regulating means to bring said rod within the melting action of fusion heating inductor source, collecting crucible, radiation shields conformably disposed in said vessel to protect the aforesaid heat sources from damage due to radiation from the metal rod, inlet and outlet valves fixedly united in said vessel, whereby said vessel is kept filled with a gas inert to the metal to be melted, entrance guides for the metallic briquets, and exit means for the reactive-refractory metal ingots, predeterminedly mounted in said vessel.

6. In the apparatus of claim 5, the improvement consisting in the use of a crucible having a false bottom to facilitate formation of continuous ingots.

7. Apparatus for producing reactive-refractory metals in ingot form, which comprises a substantially closed vessel having in coaxial relationship therein, high frequency induction coils for continuously sintering into rod form, metal briquets, motion regulating means to bring said rod within the melting action of fusion heating inductor source, an electrically conducting crucible mold, radiation shields conformably disposed in said vessel to protect the aforesaid heat sources from damage due to radiation from the metal rod, inlet and outlet valves fixedly united in said vessel, whereby said vessel is kept filled with a gas inert to the metal to be melted, entrance guides for the metallic charge, and exit means for the reactive refractory ingots, predeterminedly mounted in said vessel.

8. A method of producing reactive-refractory metals in ingot form, which comprises providing an inert atmosphere consisting of a mixture of helium and argon in a melting furnace, introducing pre-formed briquets of said metal in said furnace, sintering said juxtaposed briquets within said furnace and joining said briquets together to form a continuous rod of metal, and induction heating this rod so as to fuse it.

9. A method of producing titanium metal in ingot form, which comprises providing an inert atmosphere consisting of a mixture of helium and argon in a melting furnace, introducing pre-formed briquets of titanium metal in said furnace, sintering said juxtaposed briquets within said furnace and joining said briquets together to form a continuous rod of metal, and induction heating this rod so as to fuse it.

References Cited in the file of this patent

UNITED STATES PATENTS

| | | |
|---|---|---|
| 2,124,262 | Samuelson et al. | July 19, 1938 |
| 2,541,764 | Herres et al. | Feb. 13, 1951 |
| 2,640,860 | Herres | June 2, 1953 |
| 2,686,864 | Wroughton et al. | Aug. 17, 1954 |
| 2,688,169 | Gruber et al. | Sept. 7, 1954 |

FOREIGN PATENTS

| | | |
|---|---|---|
| 671,171 | Great Britain | Apr. 30, 1952 |